United States Patent [19]

Scura

[11] Patent Number: 5,366,200
[45] Date of Patent: Nov. 22, 1994

[54] SHOCK MOUNT ASSEMBLY

[76] Inventor: John E. Scura, 3094 Wild Horse Ct., Thousand Oaks, Calif. 91360

[21] Appl. No.: 953,921

[22] Filed: Sep. 29, 1992

[51] Int. Cl.$^5$ .......................................... F16M 13/00
[52] U.S. Cl. .................................. 248/632; 248/638; 248/635; 360/97.02
[58] Field of Search .............. 248/632, 634, 635, 609, 248/638; 16/2, 108; 267/292, 293; 360/97.02; 411/542, 544, 533, 970, 979

[56] References Cited

U.S. PATENT DOCUMENTS

| | | | |
|---|---|---|---|
| 2,179,959 | 11/1939 | Schroedter | 267/293 |
| 2,393,071 | 1/1946 | Schaelchlin | 248/635 |
| 3,412,990 | 11/1968 | Gladstone | 267/220 |
| 3,912,278 | 10/1975 | Teutsch | 360/97.02 |
| 4,901,014 | 2/1990 | Riegger et al. | |
| 5,004,207 | 4/1991 | Ishikawa et al. | 248/632 |
| 5,021,905 | 6/1991 | Sleger | |
| 5,035,396 | 7/1991 | Krum et al. | |
| 5,079,655 | 1/1992 | Yagi | |

*Primary Examiner*—Eugenia Jones
*Assistant Examiner*—Allan M. Schrock
*Attorney, Agent, or Firm*—Poms, Smith, Lande & Rose

[57] ABSTRACT

Vibration and shock mounting of an apparatus such as a disk drive is dampened through the use of one or more O-rings held in place by a bolt with a pre-determined load force applied to the mounting bracket of the device. One or more notches or slits may be selectively employed as required to equalize the force applied to multiple mounting brackets by the device.

9 Claims, 3 Drawing Sheets

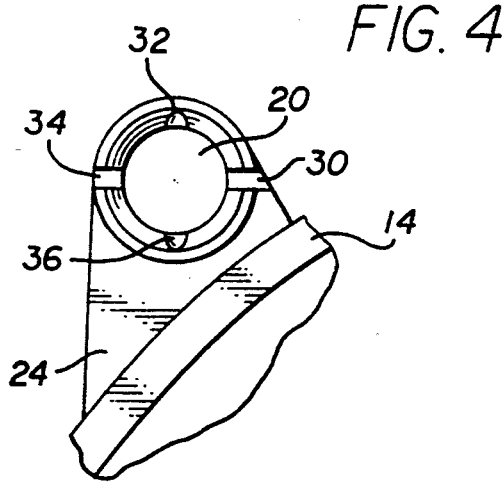
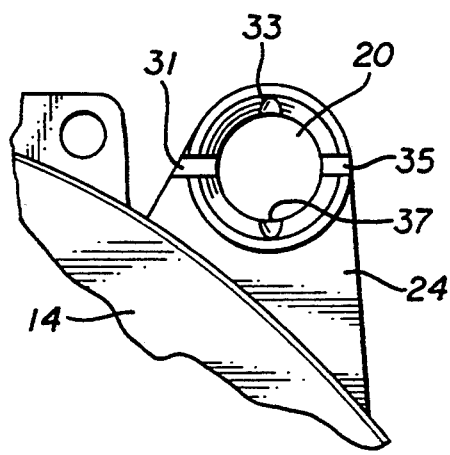
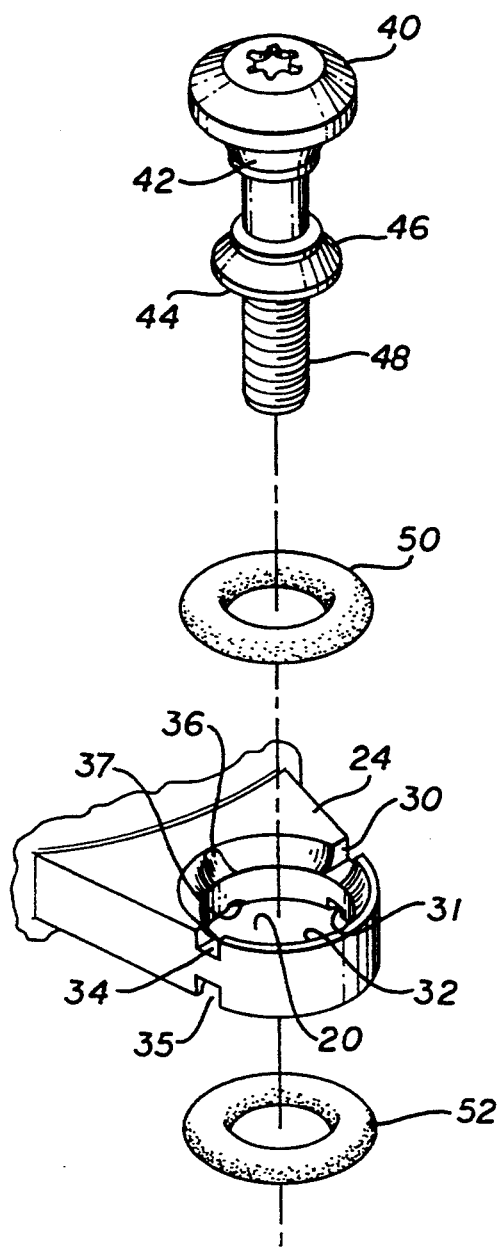
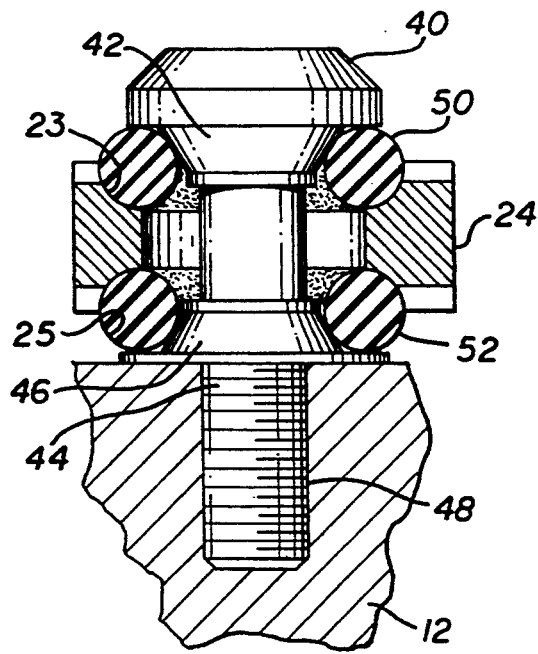

SHOCK MOUNT ASSEMBLY

FIELD OF THE INVENTION

The present invention generally relates to shock mounts which are employed on apparatus which has a tendency to vibrate.

BACKGROUND OF THE INVENTION

Devices which employ moving parts are generally driven by motors or other electro-mechanical, hydraulic, or pneumatic mechanisms. Even in the best of conditions where all of the elements of the system are balanced, there is a tendency for moving parts to generate vibrational forces. In many contexts, these vibrational forces are undesirable, but do not significantly adversely affect the performance of the apparatus.

Another problem is mechanical shock which may be transmitted to an apparatus by acts as innocent as bumping into a table. An assortment of rubber feet and grommets have typically been placed underneath electronic devices such as computers in order to create a non-skid grip and to attempt to insulate the apparatus from the effects of mechanical shock or vibration. Rubber feet are typically affixed to the bottom of a chassis or board and it is placed on a table or other surface. The entire weight of the apparatus rests on the feet. Typically rubber feet do not provide a substantial amount of shock resistance or vibration dampening.

This approach is shown in Yagi, U.S. Pat. No. 5,079,655. A similar approach, the use of a rubber grommet, is shown in Krum, U.S. Pat. No. 5,035,396.

Grommets have been used in a variety of capacities, both to insulate and protect wire harnesses, and the like. as well as to dampen vibration. A typical grommet is formed of rubber or other playable material and has a slot in the side of the grommet. To attach a grommet to a circuit board or metal chassis, a hole is formed in the circuit board or chassis. The grommet is then deformed into the hole and the slot in the grommet positioned to match the circuit board or chassis. Wires may then be fed through the grommet, protecting them from the abrasive characteristics of a metal chassis, or circuit board. In certain applications, screws are fed through the center of a grommet to attach the chassis to a mounting surface. The screws are typically tightened as much as is practically possible by the installer. The primary use of the grommet in this fashion is to mount the chassis or circuit board to another surface and electrically insulate or isolate the chassis or circuit board. In applications where a shock mount or vibration mount is more desired, a large washer is typically placed over the grommet and a machine screw is fed through the hole in the washer and the grommet and tightened against the mounting platform.

This mounting technique does not provide for vibrational dampening or shock mounting characteristics that are widely repeatable from unit to unit as the position and size of the washer, as the strength of the assembler will determine the compression of the grommet, and thus the dampening characteristics of the assembly.

U.S. Pat. No. 4,901,014, issued to Rigger, employs two O-rings located around a hollow shaft of a rotational signal generator to compensate for misalignments of the rotatable component part. The O-rings are tightly sandwiched between the central hollow shaft, and the surrounding generator carrier or frame. Rigger does not seek to measure or equalize forces amongst a variety of pressure points, nor to actively reduce vibration of the assembly, but merely to compensate for misalignment of a signal generator component.

Floppy disk drives have been around for a number of years, and originally had a track width of approximately 12¼ thousandths of an inch. These disk drives originally had a capacity of 360 kilobytes of data, stored on both sides of a 5¼" floppy. Vibrational effects were not particularly devastating given the width of the track and the density of data storage. These disk drives had a track density of 48 tracks per inch and a track to track spacing of approximately 12½ thousandths of an inch. Additionally, the data transfer frequency was relatively slow, alternating between 125 khz and 250 khz, depending on the data encryption scheme being employed.

As floppy disk drives have improved, the track density has increased to 96 tracks per inch, and beyond, and the data transfer rate has effectively doubled, employing data transfer frequencies of 250 kHz or 500 kHz, depending on the data encryption scheme. In a similar manner, Winchester-type disk drives have seen a dramatic increase in the track density, 500–1,000 tracks per inch and possibly greater track densities presently being employed in a number of applications. This results in a extremely narrow track width and narrow track-to-track spacing. In addition, the data transfer rate has increased dramatically and data transfer rates of 5 MHz are not uncommon.

The effect of the narrow track widths and the high data transfer rate has resulted in the Winchester disk drive being susceptible to data transfer errors due to variations in motor speed operation, or movement of the heads with respect to the track on the storage media. This has resulted in higher precision motors being employed, as well as more precise head location schemes which typically include track positioning schemes which are highly accurate, and may be closed loop servo systems.

Additional problems are created by moving or shaking a disk drive such as a Winchester type disk drive during operation. The motor speed may be varied in an undesirable manner, or the heads may be momentarily displaced from the desired track.

One solution which has been employed in some Winchester-type disk drive products has been a bonded rubber design in which a rubber gasket or bracket is bonded to the surface of the disk drive surrounding a mounting hole, or located between mating surfaces of the disk drive assembly and mounting platform assembly. This type of design tends to be expensive to implement in each of the mounting locations. In addition, the bonded rubber design does not allow the flexibility of rapid replacement of the vibration reduction mechanism, that being the bonded rubber itself. Further, the response characteristics of the bonded rubber design is determined when the rubber is affixed to the mounting surface, and cannot be varied later except by destroying or removing the rubber material itself.

SUMMARY OF THE INVENTION

A need therefore exists for a device or mechanism which can prevent or reduce the effects of undesirable shock or vibrational forces on the operation of a disk drive.

It is therefore an object of the present invention to provide a mounting scheme which reduces the effect of shock or vibrational force on the operation of a disk drive.

It is a further object of the present invention to provide a novel mounting scheme to isolate one device or apparatus from vibration generated by a second device or apparatus.

It is yet a further object of the present invention to provide a mounting scheme which results in uniform deflection of the mounted apparatus during movement of the apparatus.

One embodiment illustrating the principles of the present invention employs two O-rings which surround and cushion the mounting bracket of a disk drive assembly to isolate it from undesired vibration. The mounting brackets on the disk drive are selectively notched or chamfered in order to distribute the force on each of the mounting brackets in a pre-determined manner to compensate for varying forces applied by disk drive to each mounting bracket.

The foregoing and still further features and advantages of the present invention as well as a more complete understanding thereof will be made apparent from a study of the following detailed description of the invention in connection with the accompanying drawings.

DESCRIPTION OF THE DRAWINGS

FIG. 4 is an expanded view of the mounting hole highlighted in FIG. 2.

FIG. 5 is an expanded view of the mounting hole highlighted in FIG. 3.

FIG. 6 is an exploded showing of the mounting hole of FIGS. 4 and 5 together with the mounting bolt O-ring assembly and showing one embodiment of the present invention.

FIG. 7 is a cross-sectional view showing the embodiment of FIG. 6 assembled and mounted on a stationary surface or disk drive carrier or frame.

DETAILED DESCRIPTION OF A PREFERRED EMBODIMENT

Figure 1:
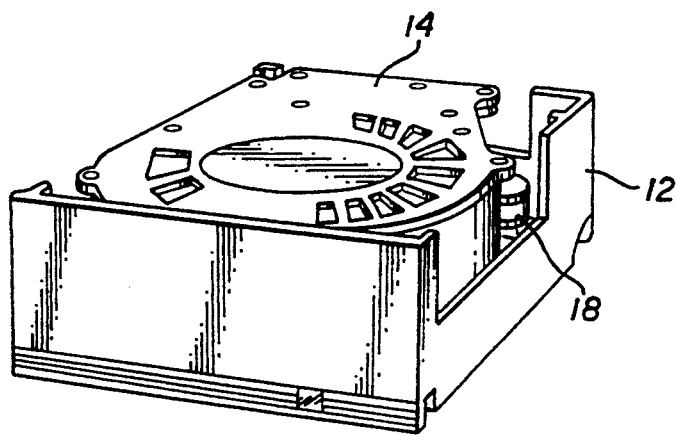
FIG. 1 is a perspective view of a disk drive.
Figure 2:
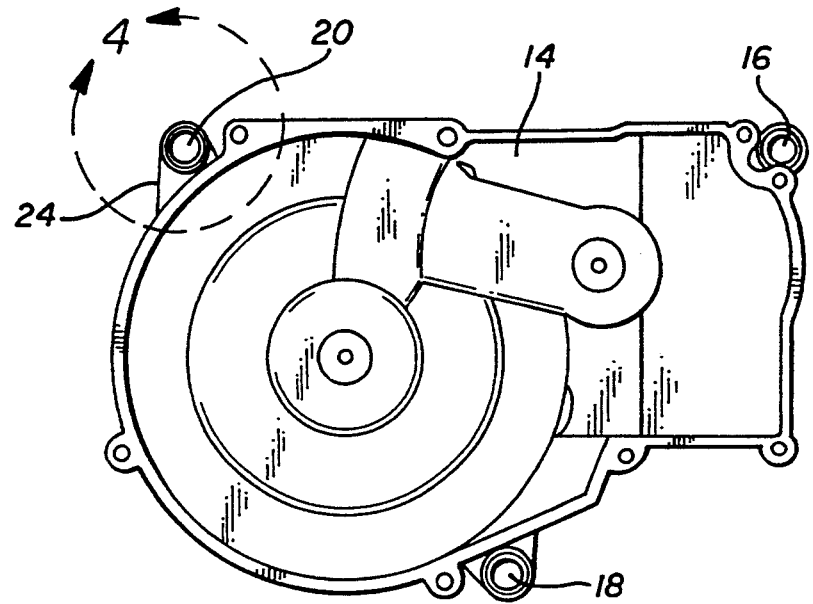
FIG. 2 is a top view of the disk drive mechanism carrier or frame.
Figure 3:
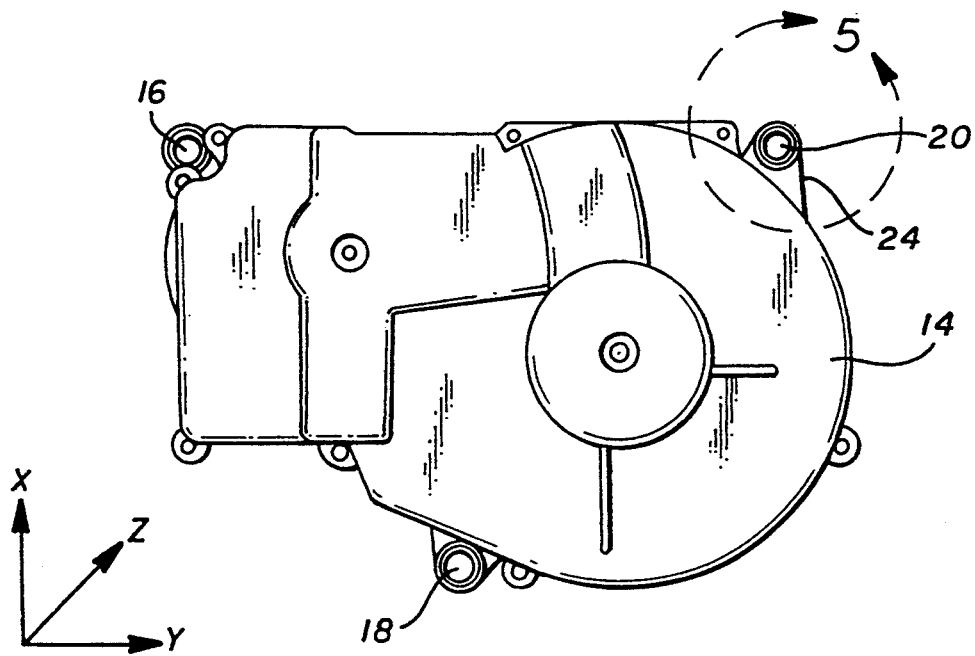
FIG. 3 is a bottom view of the disk drive mechanism carrier or frame.
Figure 8A:
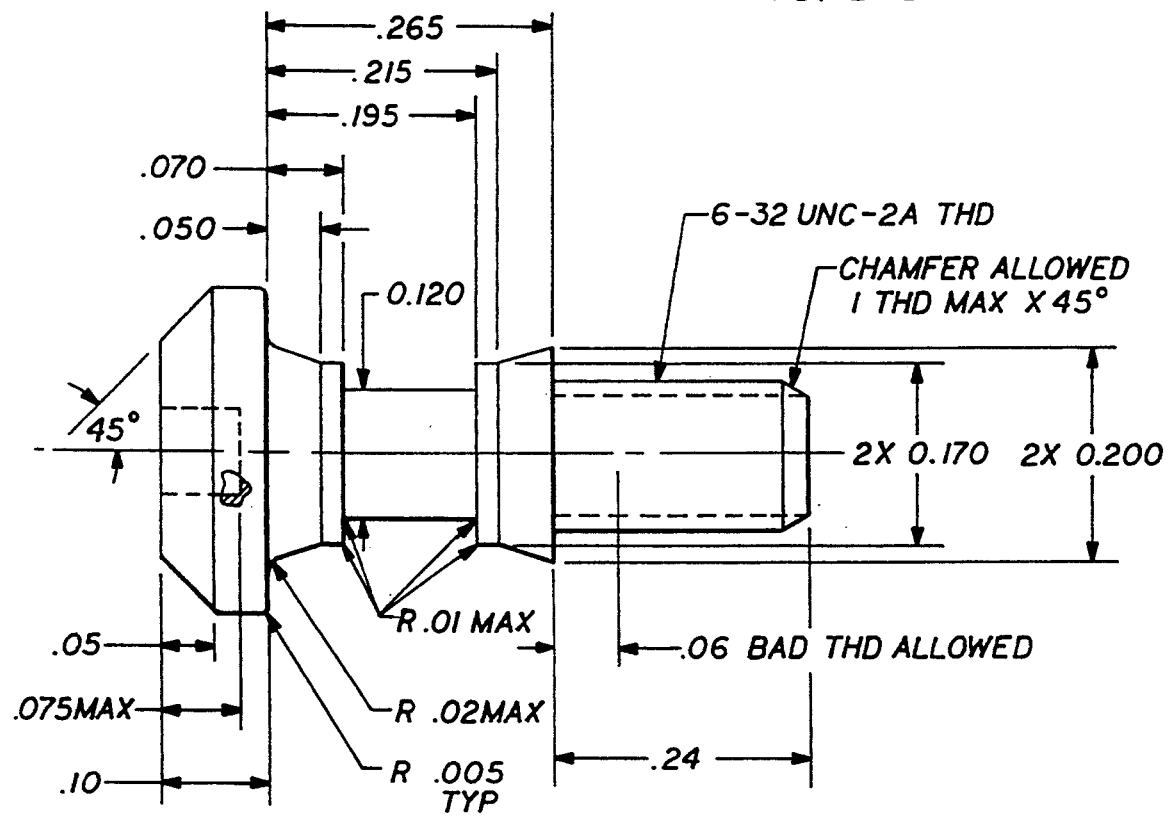
FIG. 8a and b are assembly drawings of a bolt used in one embodiment of the invention.
Figure 8B:
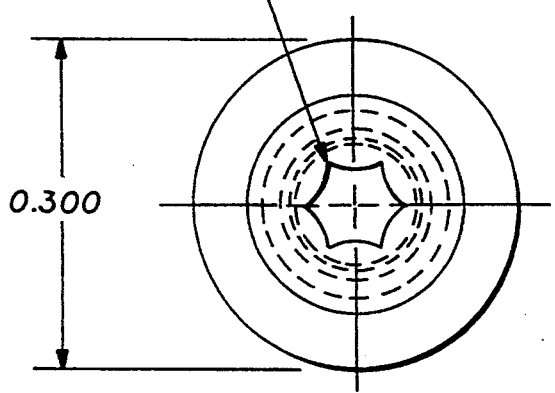

Referring first to FIGS. 1–3, there is shown a disk drive assembly having a disk drive assembly 14, a carrier or frame 12, and a plurality of mounting brackets 16, 18 and 20 which mount disk drive 14 onto carrier or frame 12. Mounting assembly 12 will be used to attach the disk drive into a computer, or the like, Where power and signal lines will then be routed to the disk drive assembly 14. Disk drive assembly 14 is the "heart and soul" of the disk drive and contains several platters of readable storage media. At least one read and/or write head is employed for each surface of each of the platters of the disk drive.

FIG. 4 shows disk drive assembly 14 in greater detail and in particular, highlights mounting holes 16, 18, and 20, which attach the disk drive assembly 14 to the carrier or frame 12. In the embodiment shown in FIG. 2, there are three mounting holes. It is recognized that a greater or fewer number of mounting holes can be employed to secure the disk drive assembly 14 to the carrier 12.

It is highly desirable to isolate disk drive 14 from vibrational forces which may be transferred through carrier or frame 12. It is equally desirable to isolate the disk drive assembly 14 from mounting frame 12 to prevent vibrational forces generated by disk drive assembly 14 from being distributed to the rest of a host computer system, which may include additional disk drive assemblies. The vibrational energy generated by disk drive assembly 14 may also set up a reflective vibrational force which may return to disk drive assembly 14 to disrupt the proper operation of the disk drive assembly.

Referring to FIG. 6, the mounting of a disk drive or other device or object which is to be vibrationally isolated from the frame on which it is mounted is assembled by locating a mounting bracket 24 on the site of the object. A hole 20 is formed in mounting bracket 24. A bolt 40 which has a beveled section 42 located beneath the head of the bolt, and a beveled section 46 located above a solid section 44, and provides an attachment means to mount the device or object to be isolated to a surrounding frame or carrier or frame or structure. The bolt 40 has a pair of O-rings 50 and 52 extending around bolt 40, and located between bolt 40 and mounting bracket 24. An assembled version is shown in the cross sectional drawing of FIG. 7. Beveled section 42 located below the head of bolt 40 may be straight or curved, and preferably has a radius greater than the radius of O-ring 50 and supplies gradual pressure to O-ring 50. A beveled section 46 formed in solid segment 44 may be straight or curved, and preferably has a radius greater than the radius of O-ring 52. Mounting bracket 24 is located between O-rings 50 and 52. Mounting bracket 24 has recessed areas 23 and 25 to engage O-rings 50 and 52, respectively.

The width of mounting bracket 24 is designed to accommodate the diameter of O-rings 50 and 52 and the spacing of solid segment 44 from the top of bolt 40. This allows a predetermined force to be applied to mounting bracket 24 by O-rings 50 and 52. Varying the spacing varies the pre-compression of O-rings 50 and 52 and changes the dampening characteristics of the apparatus.

In developing the present invention and applying it to disk drive assemblies, it has been observed that an unequal distribution of force is presented to each of the mounting points 16, 18 and 20. This resulted in different response and dampening characteristics being present on each of the mounting members 16, 18 and 20. Thus, the need to equalize the load distribution amongst mounting holes 16, 18 and 20 was recognized in order to establish a more balanced configuration of disk drive assembly 14 when mounted to assembly 12.

In order to equalize the response and dampening characteristics, it was observed that lateral cuts or indentations made in the surfaces 23 and 25 of mounting bracket assembly 24 would change the compression of O-rings 50 and 52, thus changing the spring constant of O-rings 50 and 52 which in turn would vary the loading of force applied by O-rings 50 and 52 to mounting bracket 24.

It was also observed that the direction of force varies based on the location of each of the mounting holes 16, 18 and 20, and that each had its own components in the X, Y and Z axis. In addition, there was a torsional or twisting component about the center of bolt 40 which must be accommodated. Through repeated experimentation, it was determined that several slots or channels in both the top portion 23 and the bottom portion 25 of the mounting bracket 24 were preferable to accommodate the summation of forces.

For ease of implementation, an Y axis was established between the center of mounting hole 20 and the center of mounting hole 16. A X axis was established perpendicular to the Y axis extending towards the side of drive assembly 14 on which mounting hole 18 was located. A Z axis was established perpendicular to both the X and Y axis.

The torsional component was found to operate by causing a twisting motion about the Z axis. Referring to FIG. 2, the Y axis would extend right to left through mounting hole 20 on mounting hole 16. The X axis would extend toward the top and bottom of the sheet, perpendicular to the Y axis. The Z axis would extend in a direction perpendicular to the sheet, and the X and Y axis.

Slots 30 and 34 are machined in surface 23 of mounting bracket 24 along the Y axis. Indentations 32 and 36 were machined in surface 23 of bracket 24 in the plane of the X axis. It was found that more pressure relief was required in the Y plane than in the X plane, thus channels 30 and 34 are wider and deeper than indentations 32 and 36.

A set of channels and indentations are placed in the surface 25 of mounting bracket for corresponding to the channels and indentations located in surface 23 of mounting bracket 24. Channel 31 is immediately opposite channel 30. Channel 35 is immediately opposite channel 34. Indentation 33 shown in FIG. 5 is immediately opposite indentation 32 as shown in FIG. 4. Indentation 37 is immediately opposite indentation 36 as shown in FIGS. 4, 5 and 6.

The configuration of the channel or indentation on surface 23 is designed to match the configuration of the channel or indentation on surface 25 of mounting bracket 24. It is recognized that variations may be required based on the particular characteristics of the apparatus which is being stabilized with respect to vibrational force. The channels 30, 31, 34, and 35 and the indentations 32, 33, 36, and 37 provide areas for O-rings 50 and 52 to selectively expand in response to the force transferred by the disk drive 14.

Slots, such as slots 30, 34, 31, and 35, as well as indentations such as indentations 32, 33, 36, and 37, as shown in FIG. 6, provide a greater area for expansion of the O-rings as pressure is applied. This allows a greater deflection of the O-rings into the slots and indentations which serves to reduce the spring constant of the O-rings. By selectively reducing the spring constant in one or more mounting bracket, the amount of force can be equalized between the mounting brackets. As part of this equalization, the physical deflection of the O-rings located near certain mounting brackets will be greater than the physical deflection which occurs at other mounting brackets.

By reducing the spring constant of the O-rings, a greater deflection of the O-rings is allowed. This allows greater movement or deflection of the disk drive assembly in the area having a lower spring constant. Because mounting hole 20 was subjected to noticeably less force, and bears less weight than mounting holes 16 and 18, having a spring (in the form of an O-ring) with a lower spring constant causes the deflection of the disk drive assembly to be roughly equal at each of the mounting holes 16, 18 and 20. This causes the disk drive assembly to move uniformly and reduces or eliminates undesired torsional forces and undesired wobbling movement.

This allows the force loading to be distributed relatively equally across mounting holes 16, 18 and 20. This distribution allows more uniform movement of the disk drive assembly 14 and prevents a stress point from building up around any of the mounting holes which is unequal to the pressure building up around any of the other mounting holes. This prevents a moment of inertia or torque from being centrally located at any one of the mounting holes, as the forces are equally distributed.

In one embodiment, the present invention employs two O-rings, 50 and 52, which are approximately 3/32" thick and have an outer diameter of 11/32". The bolt has an overall length of $\frac{7}{8}$" of which the lower quarter inch is threaded. The diameter of the second flange 44 is approximately 3/16" and tapers down to a diameter of 5/32". The body of the bolt is approximately $\frac{1}{8}$" in diameter. The head of the bolt is approximately 5/16" across, and the upper flange and tapered area 42 is identical to the lower flange and tapered area 44 and 46.

The size of the present invention compares favorably with the prior art grommets which have been used in this same application which typically exceed 1" in length and have a diameter of approximately $\frac{1}{2}$". Thus, the present invention saves space on a disk drive assembly which would otherwise be used for shock and vibration mounting apparatus. The mounting brackets 16, 18 and 20, located on the disk drive assembly, each are approximately $\frac{3}{8}$" across and contain a hole having an inner diameter of approximately $\frac{1}{4}$". Cut out sections 30, 31, 34 and 35 are each approximately 1/16" wide.

It is desirable, although not absolutely necessary, to exactly match the deflection at each of the mounting points to equalize the force loading to, for example, 33⅓% each. As long as the force loading is fairly equal, the problem will be substantially solved. This is not to say, however, that it is desirable to allow deflection at one of the mounting points to become excessive with respect to the other mounting points.

The cost reduction realized by implementing the embodiment shown in the figures has resulted in a cost reduction of approximately fifty percent over the cost of bonded rubber designs which were previously employed. This fifty percent cost reduction is a fringe benefit which accompanies the superior performance of the present design, and the versatility built into the present design which also provides a superior performance of the present invention over the bonded rubber design.

There has been described hereinabove a preferred embodiment of an apparatus for reducing vibration of a motorized object, and equalizing the vibrational and other forces applied by that object to the brackets to which it is mounted. Those skilled in the art may now make numerous uses of departures from the above-described embodiment without departing from the scope of the inventive spirit which is defined solely by the scope of the following claims.

What is claimed is:

1. A vibration mount and disk drive system for mounting a disk drive assembly including at least one of a read, write, or read and write head, a drive motor, and a head positioning apparatus to a mounting base, the system comprising:

at least three mounting brackets located on pre-determined areas of the disk drive assembly, each mounting bracket having a first side and a second side;

at least three mounting bolts, each mounting bolt having a head, a first flange, a second flange and an attachment segment, wherein the first flange is located immediately below the head of each mounting bolt, the first flange comprising an annular ring, the annular ring of the first flange being wider adjacent to the head of each mounting bolt and narrower further away from the head of each mounting bolt, the second flange being located between the head and the attachment segment of each mounting bolt, the second flange comprising an annular ring, the annular ring of the second flange being wider adjacent to the attachment segment and narrower toward the head of each mounting bolt;

a circular mounting opening located on each of the mounting brackets the mounting opening having a diameter greater than the widest diameter of the second flange of each mounting bolt;

a first O-ring located between the first flange of each mounting bolt and each mounting bracket, the first O-ring being formed from a resilient material and having a radius less than the radius of the annular ring of the first flange of each mounting bolt;

a second O-ring located between the second flange of each mounting bolt and each mounting bracket, the second O-ring being formed from a resilient material and having a radius less than the radius of the annular ring of the second flange of each mounting bolt;

a first annular ring groove located on the first side of each mounting bracket, the first annular ring groove having a radius greater than the radius of the first O-ring;

a second annular ring groove located on the second side of each mounting bracket, the second annular ring groove having a radius greater than the radius of the second O-ring; and at least one compression relief notch cut into at least one of the first annular ring groove, the second annular ring groove, the first flange of each mounting bolt or the second flange of each mounting bolt;

wherein the disk drive assembly is mounted to the mounting base by passing one mounting bolt through each of the mounting openings and securing the attachment segment of each mounting bolt to the mounting base such that the first flange of each mounting bolt is located at a predetermined distance from the mounting base and such that the first and second O-rings are deformed into each compression relief notch when subjected to pressure.

2. The system as described in claim 1 in which the annular ring of the first flange of each mounting bolt is gradually curved such that the annular ring of the first flange is wider adjacent to the head of each mounting bolt and gradually narrowing away from the head of each mounting bolt; and the annular ring of the second flange of each mounting bolt is gradually curved, such that the annular ring of the second flange is wider adjacent to the attachment segment of each mounting bolt and gradually narrowing away from the attachment segment towards the head of each mounting bolt.

3. A vibration mount and disk drive system comprising:

a disk drive;
a mounting base;
at least three mounting flanges located on said disk drive;

mounting means on said mounting base in locations corresponding to said mounting flanges;

at least one O-ring located between each of said mounting means and said mounting flanges to provide a resilient mount having a spring constant;

a preloading means located on and connecting said mounting flanges with said mounting means and applying a predetermined force to said O-rings; and pressure relief means located in at least one of said mounting flanges to provide a spring constant different from the spring constant of the resilient mount associated with the remaining mounting flanges.

4. The system as described in claim 3 in which said mounting means further comprises a plurality of mounting bolts each having a head, first and second flared areas and an attachment segment, said first flared area of said mounting bolt located immediately below the head of said bolt, said second flared area of said mounting bolt located between the head of said bolt and the attachment segment of said bolt and further comprising:

at least one mounting hole located in each of said mounting flanges, said mounting hole being at least as large as said second flared area of said mounting bolt such that said second flared area of said mounting bolt passes through said hole.

5. The system as described in claim 4 in which said first flared area further comprises an annular ring surrounding each of said bolts which is gradually sloped, having a larger diameter adjacent to the head of each of said bolts and gradually tapering to a smaller diameter towards the attachment segment of each of said mounting bolts;

said second flared area further comprising an annular ring surrounding each of said bolts, said second flared area further being tapered, having a wider diameter on the side of said second flared area adjacent to said attachment segment, and being gradually tapered to a smaller diameter towards the head of each of said mounting bolts.

6. The system of claim 3 in which said preloading means further comprises a rounded recess located immediately adjacent to said O-rings.

7. The system of claim 3 in which said pressure relief means further comprises one or more discontinuous areas in said preloading means.

8. A vibration-shock mount system for mounting a disk drive assembly including at least one of a read, write, or read and head, a head drive motor, and a head positioning apparatus to a mounting base, the system comprising:

at least three mounting brackets located on predetermined areas of the disk drive assembly;

at least three mounting bolts, each mounting bolt having a head, a first flange, a second flange, and an attachment segment, the first flange being located immediately below the head of each mounting bolt, the second flange being located between the head of each mounting bolt and the attachment segment, each mounting bolt having a central axis;

a first resilient material located adjacent to and between the first flange of each mounting bolt and each mounting bracket, the first resilient material having at least one surface extending substantially perpendicular to the axis of each mounting bolt for positively limiting the axial movement of the first resilient material, and for providing a standardized positioning of the first resilient material relative to each bracket and each mounting bolt;

a second resilient material located adjacent to and between the second flange of each mounting bolt and each mounting bracket, the second resilient material having at least one surface extending substantially perpendicular to the axis of each mounting bolt for positively limiting the axial movement of the second resilient material, and for providing a standardized positioning of the second resilient material relative to each bracket and each mounting bolt;

pressure relief means comprising at least one slot located in each mounting bracket.

9. A vibration-shock mount system for mounting a disk drive assembly to a mounting base, the disk drive assembly including at least one of a read, write or read and write head, head drive motor, and a head positioning apparatus, the disk drive assembly applying more weight to and more heavily loading at one or more areas of the disk drive assembly, the system comprising:

three or more mounting brackets located on predetermined areas of the disk drive assembly, each mounting bracket having an opening;

a resilient mount coupling each of the brackets to the mounting base, each resilient mount having a predetermined spring constant, each resilient mount comprising two O-rings confined between retaining surfaces on a bolt with tapered flanges and an opening in each of the brackets;

means for providing a reduced spring constant to at least one of the resilient mounts associated with one of the brackets which is less heavily loaded than the other brackets, the reduced spring constant being implemented by at least one notch in at least one of the retaining surfaces and whereby the disk drive moves more uniformly and undesired torsional forces are reduced under shock conditions.

* * * * *